April 17, 1934. M. HOUDAILLE ET AL 1,954,934
ELASTIC HINGE JOINT
Filed May 11, 1931 2 Sheets-Sheet 2
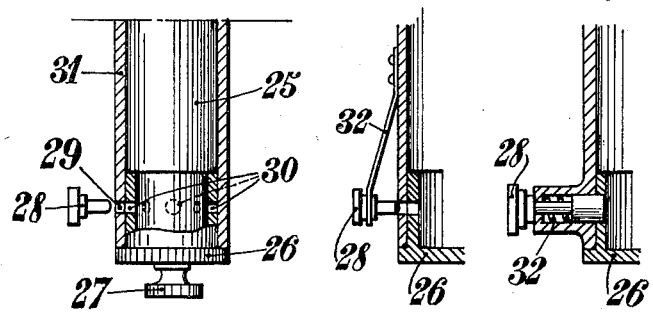
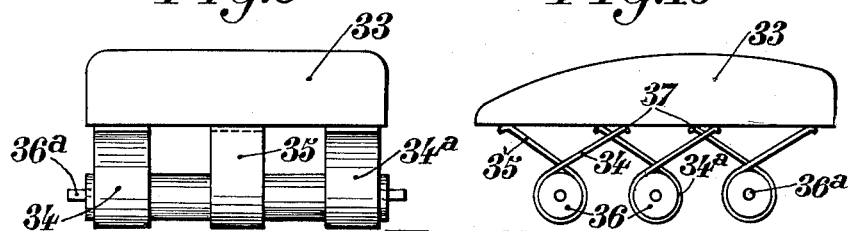
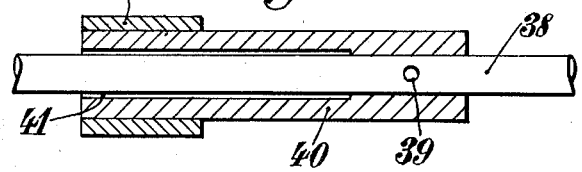
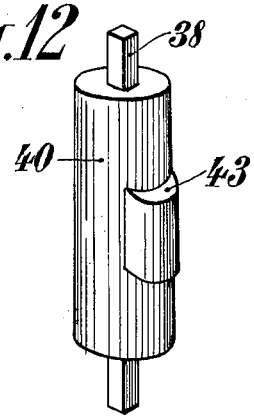
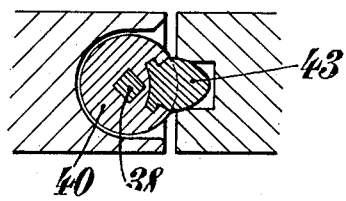

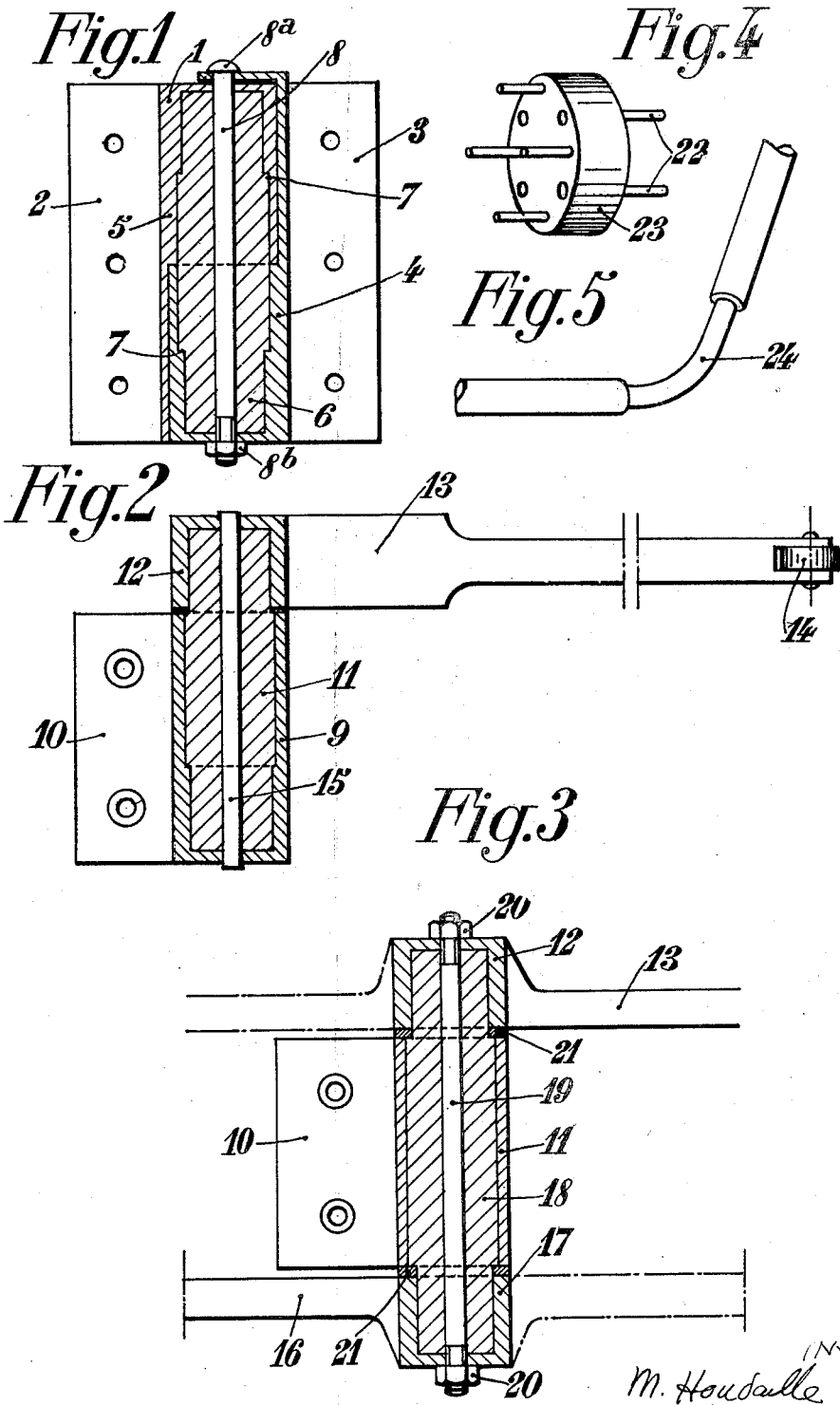

Patented Apr. 17, 1934

1,954,934

UNITED STATES PATENT OFFICE 1,954,934

ELASTIC HINGE JOINT

Maurice Houdaille and Charles Lecler, Levallois-Perret, France

Application May 11, 1931, Serial No. 536,610
In France May 15, 1930

1 Claim. (Cl. 16—128)

Hinge joint systems are known in which a body of rubber is interposed between two co-axial sockets of different diameters, angularly moving relatively to one another.

The present invention, which relates to improvements in joints for any applications and for instance for hinges and the like, differentiates from the preceding systems, in one of the possible forms of construction, in that at least two sockets or hinge eyes, substantially of the same diameter, are laterally juxtaposed on one and the same axis and rendered rigid together through the medium of a pin made of resiliently distortable material, such as rubber, inserted into the sockets and adhering thereto; this pin can encase a co-axial reinforcing metal rod.

The invention also relates to another form of construction in which the resilient connection, between at least two members preferably angularly movable, is obtained by the combination in a single structure, of an annular rubber cylinder angularly connected at any desired point, on the one hand, to a pin axially arranged in the rubber and, on the other hand, to at least one ring surrounding the rubber, the securing points of the ring and of the rubber pin being located in different transverse planes.

The features previously indicated, can be carried out according to numerous forms of construction which are all included in the scope of the invention and can differ from each other particularly:

By the shape and arrangement of the hinge eyes,

By the means for rendering the pin rigid with the hinge eyes or with the spindle, By the shape and arrangement of the pins for connecting the sockets or hinge eyes.

The invention further relates to detail objects forming a part of the main object and particularly:

(a) To means for regulating the torsion of the pin, in which the latter is rendered rigid, in any suitable manner, with a socket provided with peripheral recesses; a torsion of the pin can bring one of these recesses opposite a port of one of the hinge eyes, provided with a suitable locking device.

(b) To an oscillating locking bolt, made of ebonite or other material, rendered rigid with the rubber pin, which is held on the other hand, either by external sockets, or by a spindle and adapted to serve as a locking device for any application.

(c) To a suspended seat, in which the resilient means are constituted by joints according to the preceding features, each hinge eye being rigid with leaves terminating in a shoe member bearing on the lower part of the seat and directly sliding on the latter or in suitable grooves, the joints being secured on the fixed part of the seat in any suitable manner.

The invention extends to all applications of the joint devices previously set forth, such as resilient hinges, or as shock absorbers utilizable in general as springs.

Several forms of construction are illustrated, by way of example only, in the accompanying drawings in which:

Fig. 1 is a section of an improved hinge according to the invention.

Fig. 2 is a sectional view of a returning device.

Fig. 3 is a section of a modification.

Fig. 4 illustrates an improved resilient joint for driving two shafts.

Fig. 5 illustrates a resilient joint for driving two shafts the longitudinal axes of which are different.

Figs. 6, 7 and 8 illustrate a device for regulating the torsion of the pin.

Figs. 9 and 10 are an elevation and a side view of a suspended seat.

Fig. 11 is a constructional modification of a joint.

Figs. 12 and 13 are a perspective view and a section of an oscillating resilient locking bolt.

In the form of construction illustrated in Fig. 1, a hinge 1 comprises two leaves 2 and 3 respectively constituting hinge eyes or sockets 4 and 5 connected by a pin or pintle 6 made of resilient material, such for instance as rubber. This pin is rendered rigid with the hinge eyes 4 and 5, preferably by glueing and compression; the inner part of the hinge eyes can be provided with steps 7 or with suitable projections in order to prevent any sliding movement of the pin in the hinge eyes. The pin 6 can, as is the case, have a co-axial reinforcing rod 8, free to rotate either in the pin, or in the upper and lower parts of the hinge eyes. This rod, provided with a head $8^a$, is secured by a nut $8^b$. It will be noted that the pin 6 acts as a returning spring and allows the automatic closing of a door without using spring or compressed air systems which require constant maintenance.

In Fig. 2, a pin made of resiliently distortable material is used in a door closing apparatus.

The apparatus comprises a hinge eye 9 carried by a leaf 10 for securing it on a door frame and in which is inserted a pin 11 secured to the hinge eyes as previously indicated. The upper part of the pin 11 is inserted in the hinge eye 12 of a lever 13 carrying, at its end, a roller 14 pressed against the door to be closed. A metal rod 15 connects the hinge eyes for reinforcing them.

A constructional modification (Fig. 3) can comprise a second lever 16, the hinge eye 17 of which is fitted into the lower part of a pin 18. The connection between the three hinge eyes is reinforced, as in the preceding forms of construction, by a metal rod 19 held on either side by nuts 20. Such a device is adapted to be used for automatically closing a double door. In the three forms of construction above described, the hinge eyes can fit on each other through the medium of independent washers (Fig. 3) made of fibre or of rubber, or of flanges forming a part of the rubber pin.

The invention also relates to resilient joints (Figs. 4 and 5) adapted to render two shafts angularly rigid with one another. In the first case, the shafts arranged end to end can have a flange perforated with holes in which enter the stems of bolts 22 mounted on a resiliently distortable cylinder 23. Such an arrangement allows the driving of two shafts imperfectly aligned. In the case of two shafts to be driven and the longitudinal axes of which are different, use will conveniently be made of a connection constituted by a rod 24 made of resiliently distortable material such as rubber (Fig. 5).

Such an arrangement is convenient in that both shafts can be arranged in any manner relatively to each other, such an actuation being impossible with a metal Cardan joint. Use could even be made of pins or rods constituted by a bundle of wire, twisted or not, held in any suitable manner.

Fig. 6 shows a device for regulating the torsion of the pin for the purpose of obtaining a more powerful and more complete restoring movement of a door. This result is obtained in the following manner:

A pin 25 is rendered rigid with a member 26 having an operating knob 27. A rod 28 is fitted in a hole 29 of the hinge eye 31 and in one of the holes 30 formed on the periphery of the member 26, thus rendering the hinge eye rigid with the resilient pin. The rod 28 can be held in locking position by a spring 32 secured in any suitable manner (Figs. 7 and 8).

A seat 33 (Figs. 9 and 10) can conveniently be suspended through the medium of improved joints according to the invention. In this application, the joint has three hinge eyes 34—35 and 34ª rigid with the pin 36, as previously indicated. The hinge eyes bear on the lower part of the seat, which is guided in any suitable manner, through their shoe shaped ends 37. When the seat collapses, the shoe members 37 slide, thus determining the torsion of the pin 36. A spindle 36ª can be secured on the support of the seat.

A constructional modification is illustrated in Fig. 11, in which one of the hinge eyes is constituted by an axial rod 38 preferably of polygonal cross section, rendered rigid in any suitable manner, for instance by a stud 39, with one of the ends of a pin 40.

A bore 41 allows the release of the pin 40 and rod 38 in the portion of the pin which is externally rendered rigid with a second hinge eye 42 constituted by a socket.

One of the numerous applications of this modification (Figs. 12 and 13) consists in providing on the pin 40 a locking bolt 43, made for instance of ebonite or other material. The rod 38 being secured in a suitable mounting, the locking bolt 43 will oscillate in one direction or the other for engaging with a corresponding staple or for disengaging therefrom.

It is obvious that the forms of construction which have been described are given by way of example only, and that the shape of the pins, their arrangement and the assemblage of the various parts can be modified in any suitable manner without departing from the scope of the present invention.

What we claim as our invention and desire to secure by Letters Patent is:

A hinge comprising leaves having axially alined abutting sockets closed at their outer ends, a pintle of elastic composition seated at its ends in said sockets and held against displacement therein, said pintle normally tending to close the leaves against each other, a rod extending loosely through the axis of the pintle and the heads of the sockets, said rod having abutments on its ends bearing against the socket heads to maintain the inner ends of the sockets in abutting relation against the expansion tendency of the pintle incident to the opening and closing of the hinge leaves.

MAURICE HOUDAILLE.
CHARLES LECLER.